(12) United States Patent
Eckett et al.

(10) Patent No.: US 9,915,225 B2
(45) Date of Patent: Mar. 13, 2018

(54) PROPULSION SYSTEM ARRANGEMENT FOR TURBOFAN GAS TURBINE ENGINE

(71) Applicant: United Technologies Corporation, Hartford, CT (US)

(72) Inventors: Christopher A. Eckett, West Hartford, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 453 days.

(21) Appl. No.: 14/615,484

(22) Filed: Feb. 6, 2015

(65) Prior Publication Data

US 2018/0030926 A1 Feb. 1, 2018

(51) Int. Cl.
*F02K 3/075* (2006.01)
*F02K 1/72* (2006.01)
(Continued)

(52) U.S. Cl.
CPC ............... *F02K 1/72* (2013.01); *B64D 27/26* (2013.01); *B64D 29/06* (2013.01); *B64D 33/04* (2013.01);
(Continued)

(58) Field of Classification Search
CPC ... F02K 3/075; F02K 3/06; F02K 1/70; F02K 1/72; Y02T 50/671
See application file for complete search history.

(56) References Cited

U.S. PATENT DOCUMENTS 3,287,906 A  11/1966 McCormick
5,174,525 A * 12/1992 Schilling .................... 244/54
(Continued)

FOREIGN PATENT DOCUMENTS

EP  1976758  7/2010
FR  2991670  6/2014
(Continued)

OTHER PUBLICATIONS

Croft, J. (2009). Integrated propulsion systems: The engine connection. Retrieved Dec. 17, 2014 from http://www.flightglobal.com/news/articles/integrated-propulsion-systems-the-engine-connection-333001/.

(Continued)

*Primary Examiner* — Craig Kim
(74) *Attorney, Agent, or Firm* — Carlson, Gaskey & Olds P.C.

(57) ABSTRACT

A method of designing an engine according to an exemplary aspect of the present disclosure includes, among other things, designing an engine and a nacelle assembly together in an interactive process, the engine including a turbine section configured to drive a fan section and a compressor section. The step of designing the compressor section includes the step of designing a first compressor and a second compressor, with an overall pressure ratio being greater than or equal to about 35. The step of designing the nacelle assembly includes the step of designing the fan section to include a fan nacelle arranged at least partially about a fan, with the fan section having a fan pressure ratio of less than about 1.7. The step of designing the fan section includes configuring the fan section to deliver a portion of air into the compressor section, and a portion of air into a bypass duct, and with a bypass ratio equal to or greater than about 5.

18 Claims, 10 Drawing Sheets

(51) Int. Cl.
| | |
|---|---|
| B64D 29/06 | (2006.01) |
| B64D 27/26 | (2006.01) |
| B64D 33/04 | (2006.01) |
| F01D 25/24 | (2006.01) |
| F02C 3/04 | (2006.01) |
| F02K 3/06 | (2006.01) |

(52) U.S. Cl.
CPC .............. *F01D 25/24* (2013.01); *F02C 3/04* (2013.01); *F02K 3/06* (2013.01); *B64D 2027/266* (2013.01); *B64D 2027/268* (2013.01); *F05D 2240/14* (2013.01); *F05D 2270/051* (2013.01)

(56) References Cited

U.S. PATENT DOCUMENTS

| | | | |
|---|---|---|---|
| 5,746,391 | A | 5/1998 | Rodgers et al. |
| 5,915,917 | A | 6/1999 | Eveker et al. |
| 7,484,356 | B1 | 2/2009 | Lair |
| 8,128,021 | B2* | 3/2012 | Suciu et al. .................. 244/54 |
| 2001/0035004 | A1 | 11/2001 | Balzer et al. |
| 2008/0092548 | A1 | 4/2008 | Morford et al. |
| 2008/0224018 | A1 | 9/2008 | Lafont et al. |
| 2010/0146933 | A1 | 6/2010 | Caruel |
| 2010/0148396 | A1 | 6/2010 | Xie et al. |
| 2010/0331139 | A1 | 12/2010 | McCune |
| 2012/0099963 | A1 | 4/2012 | Suciu et al. |
| 2012/0247571 | A1 | 10/2012 | Vauchel et al. |
| 2013/0149112 | A1* | 6/2013 | Kohlenberg et al. ...... 415/122.1 |
| 2013/0149113 | A1* | 6/2013 | Kohlenberg et al. ...... 415/122.1 |
| 2013/0192200 | A1 | 8/2013 | Kupratis et al. |
| 2013/0202415 | A1* | 8/2013 | Karl et al. ................. 415/122.1 |
| 2013/0216364 | A1 | 8/2013 | Evans |
| 2014/0165534 | A1 | 6/2014 | Hasel et al. |
| 2014/0271163 | A1 | 9/2014 | Hue et al. |
| 2014/0318149 | A1 | 10/2014 | Guillon et al. |

FOREIGN PATENT DOCUMENTS

| | | |
|---|---|---|
| FR | 3002785 | 9/2014 |
| GB | 1516041 | 6/1978 |
| GB | 2041090 | 9/1980 |
| WO | 2007038674 | 4/2007 |
| WO | 2013064762 | 10/2013 |
| WO | 2013186475 | 12/2013 |
| WO | 2014091110 | 6/2014 |
| WO | 2014147343 | 9/2014 |
| WO | 2014176427 | 10/2014 |

OTHER PUBLICATIONS

CFM International LEAP. (n.d.) In Wikipedia. Retrieved Dec. 17, 2014 from http://en.wikipedia.org/wiki/CFM_International_LEAP.
Nexcelle Press Release. Nexcelle highlights its key role for CFM International's LEAP-1C integrated propulsion system on the COMAC C919. Retrieved Dec. 17, 2014, from http://www.nexcelle.com/news-press-release/2008-2014/11-10-2014.asp.
Nexcelle Multimedia Library. Retrieved Dec. 17, 2014, from http://www.nexcelle.com/news-image-library/index.asp.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, fith Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.

(56) References Cited

OTHER PUBLICATIONS

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
European Search Report for European Patent Application No. 16154639 completed Jun. 16, 2016.

\* cited by examiner

PROPULSION SYSTEM ARRANGEMENT FOR TURBOFAN GAS TURBINE ENGINE

BACKGROUND

The present disclosure relates to a propulsion system having integrated designs for at least a nacelle and a turbofan gas turbine engine. Preferably, such integrated design accounts for an engine, an engine nacelle, and structure for connecting an engine to a wing, such as an engine pylon or portions thereof.

The aerospace industry typically approaches the design of a wing, pylon, nacelle and engine in a disjoined, hierarchical or isolated manner. Engine designers must often meet design requirements specified by airframe customers. This approach may constrain or undesirably affect the design or implementation of the engine, nacelle, mounting, and various related structure.

Designing an integrated propulsion system requires optimizing force distributions and reactions at engine mounts. A gas turbine engine may be mounted at various points on an aircraft, such as a pylon integrated with an aircraft structure. An engine mounting configuration ensures the transmission of loads between the engine and the aircraft structure. The loads typically include the weight of the engine, its thrust, aerodynamic loads, maneuver loads, and rotary torque about the engine axis. The engine mounting configuration must also absorb the deformations to which the engine is subjected during different flight phases, and for example, the dimensional variations due to thermal expansion and retraction.

SUMMARY

A method of designing an engine according to an example of the present disclosure includes the steps of designing an engine and a nacelle assembly together in an interactive process. The engine includes a turbine section configured to drive a fan section and a compressor section. Designing the compressor section includes the step of designing a first compressor and a second compressor, with an overall pressure ratio provided by the combination of a pressure ratio across the first compressor and a pressure ratio across the second compressor. The overall pressure ratio is greater than or equal to about 35. The step of designing the nacelle assembly includes the step of designing the fan section to include a fan nacelle arranged at least partially about a fan, with the fan section having a fan pressure ratio of less than about 1.7. The step of designing the fan section includes configuring the fan section to deliver a portion of air into the compressor section, and a portion of air into a bypass duct, and with a bypass ratio, which is defined as a volume of air passing to the bypass duct compared to a volume of air passing into the compressor section, equal to or greater than about 5.

In a further embodiment of any of the foregoing embodiments, the nacelle assembly includes a single bifurcation in the bypass duct.

A further embodiment of any of the foregoing embodiments includes designing a mounting assembly attachable to the nacelle assembly and the engine in the interactive process. The mounting assembly includes a forward mount, an intermediate mount and an aft mount. The forward mount is configured to react to at least a vertical load, a first side load and a torsional load relative to an axis. The intermediate mount is configured to react to at least a thrust load along the axis. The aft mount is configured to react to at least a vertical load and a second side load.

In a further embodiment of any of the foregoing embodiments, the nacelle assembly includes a hardwall containment system.

In a further embodiment of any of the foregoing embodiments, the nacelle assembly includes a fan case made of an organic matrix composite.

In a further embodiment of any of the foregoing embodiments, the turbine section includes a fan drive turbine configured to drive the fan section. A pressure ratio across the fan drive turbine is greater than or equal to about 5.

In a further embodiment of any of the foregoing embodiments, the nacelle assembly includes a noise attenuating nozzle having at least one serration defining a trailing edge.

In a further embodiment of any of the foregoing embodiments, the nacelle assembly is a slim-line nacelle.

In a further embodiment of any of the foregoing embodiments, the slim-line nacelle defines a maximum diameter and has an inlet lip defining a highlight diameter. A ratio of the highlight diameter to the maximum diameter is greater than or equal to about 0.80.

In a further embodiment of any of the foregoing embodiments, the aft mount is attachable to a mid-turbine frame of the engine.

In a further embodiment of any of the foregoing embodiments, the nacelle assembly includes a noise attenuating nozzle having at least one serration defining a trailing edge.

In a further embodiment of any of the foregoing embodiments, the ratio of the highlight diameter to the maximum diameter is greater than or equal to about 0.90.

An integrated propulsion system according to an example of the present disclosure includes components that include a gas turbine engine and a nacelle assembly. The system designed by a process includes identifying two or more of internal structural loading requirements, external structural mount loading requirements, aerodynamic requirements, and acoustic requirements for the system, and interdependently designing the components to meet the requirements. The nacelle assembly includes a fan nacelle arranged at least partially about a fan and an engine. The system includes a fan section at least partially defined by the fan nacelle, and the fan section has a fan pressure ratio of less than about 1.7. The engine includes a turbine section configured to drive the fan section and a compressor section. The compressor section includes a first compressor and a second compressor. An overall pressure ratio is provided by the combination of a pressure ratio across the first compressor and a pressure ratio across the second compressor, and the overall pressure ratio is greater than or equal to about 35. The fan section is configured to deliver a portion of air into the compressor section, and a portion of air into a bypass duct. A bypass ratio, defined as a volume of air passing to the bypass duct compared to a volume of air passing into the compressor section, is equal to or greater than about 5.

A further embodiment of any of the foregoing embodiments includes a pylon attaching the nacelle assembly and the engine to an aircraft structure.

A further embodiment of any of the foregoing embodiments includes a thrust reverser configured to selectively communicate air from the bypass duct.

In a further embodiment of any of the foregoing embodiments, the nacelle assembly is a slim-line nacelle. The slim-line nacelle defines a maximum diameter and has an inlet lip defining a highlight diameter. A ratio of the highlight diameter to the maximum diameter is greater than or equal to about 0.80.

In a further embodiment of any of the foregoing embodiments, a single bifurcation is positioned in the bypass duct.

In a further embodiment of any of the foregoing embodiments, the pylon includes a mounting assembly attachable to the nacelle assembly and the engine. The mounting assembly includes a forward mount, an intermediate mount and an aft mount. The forward mount is configured to react to at least a vertical load, a first side load and a torsional load relative to an axis. The intermediate mount is configured to react to at least a thrust load along the axis. The aft mount is configured to react to at least a vertical load and a second side load.

In a further embodiment of any of the foregoing embodiments, the intermediate mount is attachable to an engine intermediate case.

In a further embodiment of any of the foregoing embodiments, the aft mount is attachable to one of a mid-turbine frame and a turbine exhaust case.

In a further embodiment of any of the foregoing embodiments, the slim-line nacelle includes a fan nacelle arranged at least partially about a core cowling to define a bypass flow path. An aft nacelle is arranged at least partially about the core cowling to define a duct. The bypass flow path extends circumferentially about the axis between opposite sides of a single bifurcation defining the duct.

In a further embodiment of any of the foregoing embodiments, the forward mount is attachable to the fan nacelle.

In a further embodiment of any of the foregoing embodiments, the aft mount is attachable to the mid-turbine frame.

An integrated propulsion system for a gas turbine engine according to an example of the present disclosure includes a nacelle assembly and a mounting assembly attachable to the nacelle assembly. The mounting assembly includes a forward mount, an intermediate mount and an aft mount. The forward mount is configured to react to at least a vertical load, a first side load and a torsional load relative to an axis. The intermediate mount is configured to react to at least a thrust load along the axis. The aft mount is configured to react to at least a vertical load and a second side load.

In a further embodiment of any of the foregoing embodiments, the intermediate mount is attachable to an engine intermediate case.

In a further embodiment of any of the foregoing embodiments, the aft mount is attachable to one of a mid-turbine frame and a turbine exhaust case.

In a further embodiment of any of the foregoing embodiments, the nacelle includes a core cowling defined about the axis, a fan nacelle arranged at least partially about the core cowling to define a bypass flow path, and an aft nacelle arranged at least partially about the core cowling to define a duct. The bypass flow path extends circumferentially about the axis between opposite sides of a single bifurcation defining the duct.

In a further embodiment of any of the foregoing embodiments, the forward mount is attachable to the fan nacelle.

A further embodiment of any of the foregoing embodiments includes a thrust reverser positioned axially between the fan nacelle and the aft nacelle. The thrust reverser includes a cascade configured to selectively communicate a portion of fan bypass airflow from the bypass flow path.

In a further embodiment of any of the foregoing embodiments, a single bifurcation extends radially between the aft nacelle and the core cowling.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION

Figure 1:
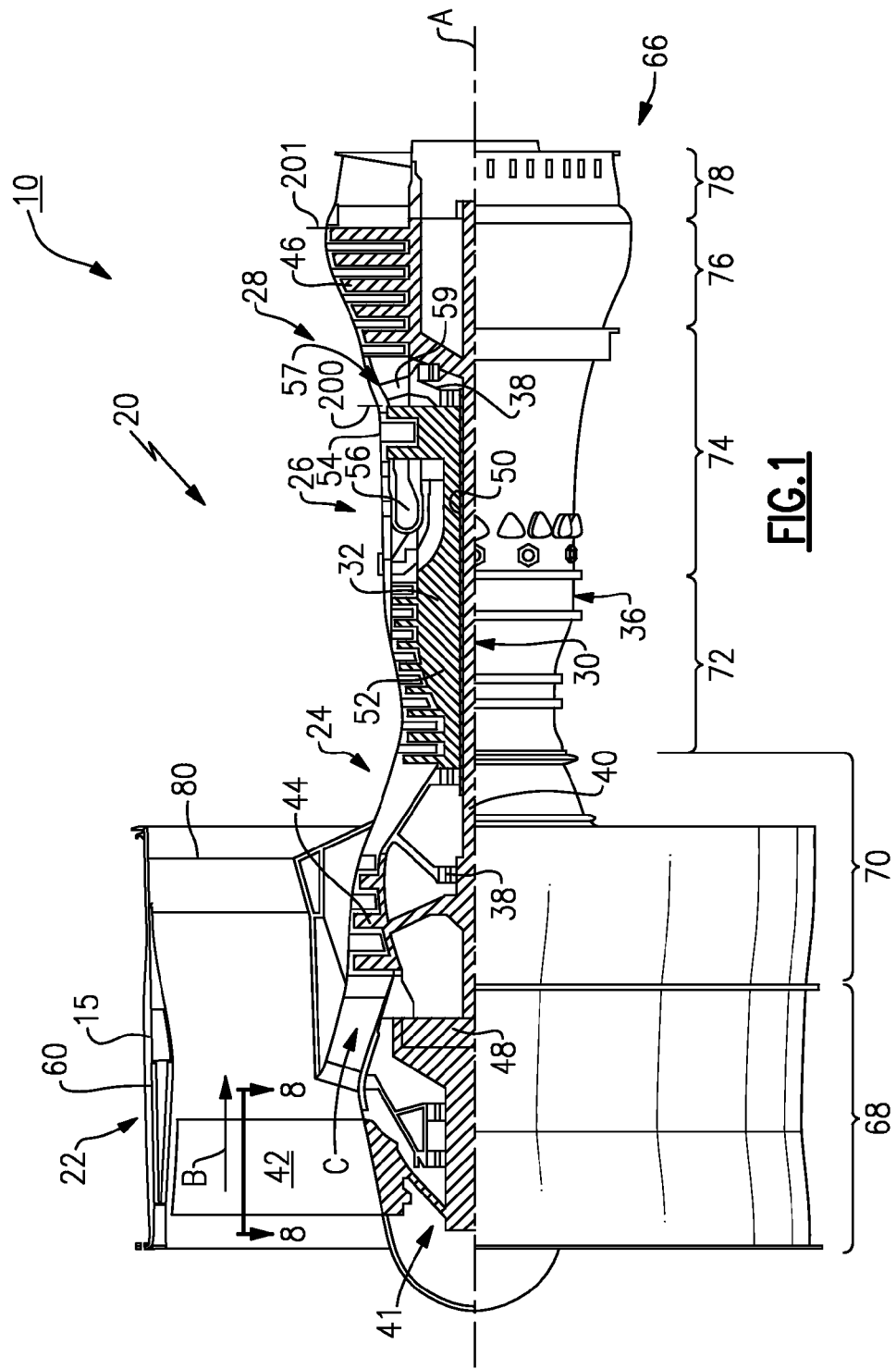
FIG. 1 shows a schematic view a gas turbine engine along an engine longitudinal axis.

An integrated propulsion system 10 generally includes an engine 20 (FIG. 1), a pylon 108 (FIGS. 3A to 4), a nacelle assembly 82 (FIGS. 3A to 4), and an aircraft structure 109 (FIG. 6A) such as an aircraft wing or fuselage. The various components of the integrated propulsion system 10 are designed and implemented in an integrated or holistic manner to achieve a new state. The term "integrated propulsion system" is utilized for the purposes of this disclosure to mean multiple propulsion components, such as a nacelle and a gas turbine engine, and in some instances, also an engine pylon and an aircraft static structure, designed or configured in an interactive process according to commonly defined and interrelated sets of requirements, such that the overall performance of the system is optimized. An explanation of this interactive process, with examples, is provided below, for example, with later reference to FIGS. 7A and 7B. This technique desirably leads to higher overall system performance in terms of size, weight and efficiency.

FIG. 1 schematically illustrates a gas turbine engine 20 of the kind which could be part of an integrated propulsion system. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. In FIG. 1, the inner shaft 40 is connected to the fan 42 through a speed change mechanism, which in exemplary gas turbine engine 20 is illustrated as a geared architecture 48 to drive the fan 42 at a lower speed than the low speed spool 30. Such a configuration is commonly referred to as a geared turbofan. Importantly, however, for an integrated propulsion system, the design considerations disclosed herein are not limited to a geared turbofan. Rather, the options for the integrated propulsion system disclosed herein are also applicable to direct drive turbofan, where a fan drive turbine directly drives the fan.

The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about five (5), or greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans, single spool configurations, and configurations having more than two spools (i.e., low spool, intermediate spool and high spool).

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. In some embodiments, the fan pressure ratio is equal to or less than about 1.80, equal to or less than about 1.70, equal to or less than about 1.60, equal to or less than about 1.55, or equal to or less than about 1.50. "Low corrected fan tip speed" is the actual fan tip speed in ft/sec divided by an industry standard temperature correction of $[(\text{Tram}\,°\,\text{R})/(518.7°\,\text{R})]^{0.5}$. The "Low corrected fan tip speed" as disclosed herein according to one non-limiting embodiment is less than about 1150 ft/second. In some embodiments, the bypass ratio is greater than or equal to about 5:1 or greater than or equal to about 8:1, between 8:1 and 13:1, or greater than or equal to about 12:1. In other embodiments, the gear reduction ratio is greater than about 2.6. In some embodiments, an overall pressure ratio is provided by the combination of a pressure ratio across a low (or first) compressor 44 and a pressure ratio across the high (or second) second compressor 52 is greater than or equal to about 35 measured at maximum climb conditions, or greater than or equal to about 40. In another embodiment, the overall pressure ratio is above or equal to about 50. For the purposes of this disclosure, the pressure ratio of the low (or first) compressor 44 includes the pressure ratio across a fan root or inner portion of the fan blade 42.

The engine static structure 36 for the illustrated integrated propulsion system 10 generally has sub-structures including a case structure 66 often referred to as the engine "backbone." In some embodiments, the case structure 66 at least partially houses the engine sections 22, 24, 26, 28 and, where applicable, the geared architecture 48. In an embodiment of the integrated propulsion system 10, the case structure 66 includes a fan case 68, an intermediate case (IMC) 70, a high pressure compressor case 72, a thrust case 74, a low pressure turbine case 76, and a turbine exhaust case 78. The fan blades 42 are surrounded by the fan case 68.

The core engine case structure 70, 72, 74, 76, 78 for the illustrated integrated propulsion system 10 is secured to the fan case 68 at the IMC 70. The IMC includes a multiple of circumferentially spaced radially extending struts 80, which radially span the core engine case structure and the fan case 68. The gas turbine engine 20 is configured to be suspended from an engine pylon 108 (shown in FIGS. 3A, 3B and 4). It should be understood that various engines with various case and frame structures may benefit from the teachings of this disclosure.

According to an aspect of the disclosed integrated propulsion system 10, the engine support structure 106 (FIG. 6A) of the pylon 108 is designed to counteract the various loads and forces observed during aircraft operation. Such a design considers and balances the competing requirements of the engine 20, nacelle assembly 82, and aircraft structure 109, as will become apparent from the teachings of this disclosure.

Figure 4:
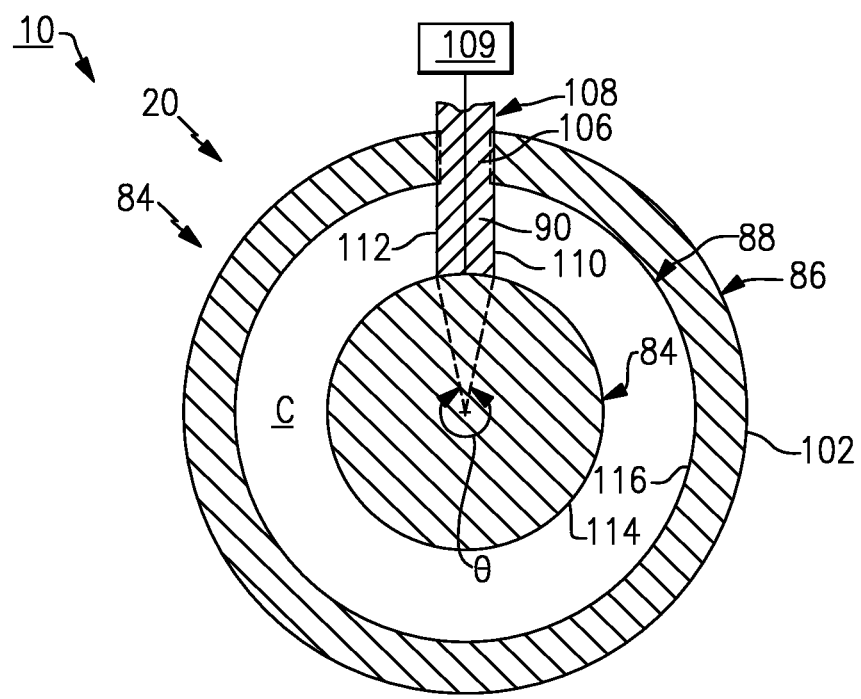
FIG. 4 is a cross section view of the engine casing of FIGS. 3A and 3B.
Figure 3A:
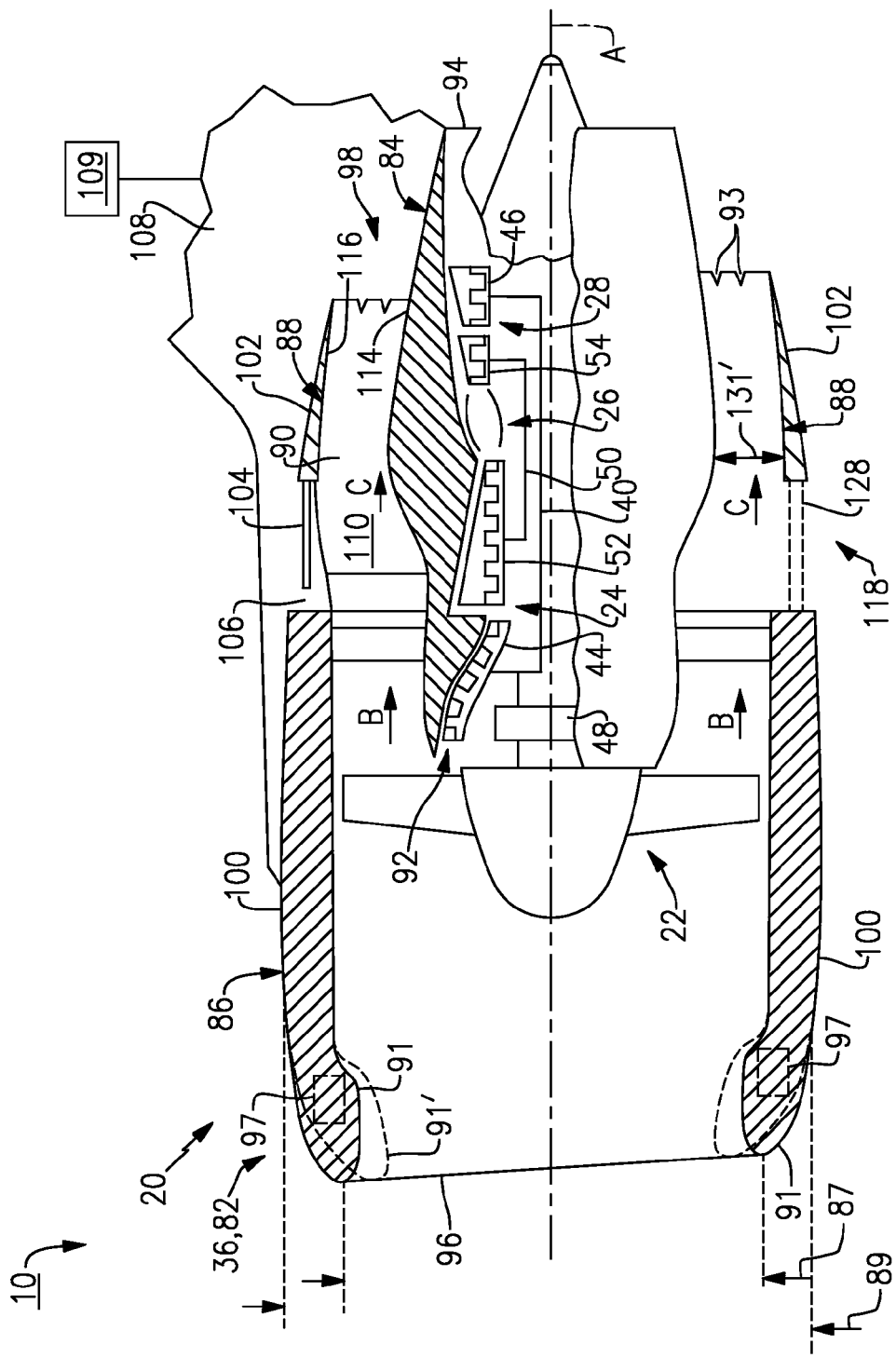
FIG. 3A is a side cutaway view of an engine casing for the turbofan engine of FIG. 1 in a deployed position.
Figure 3B:
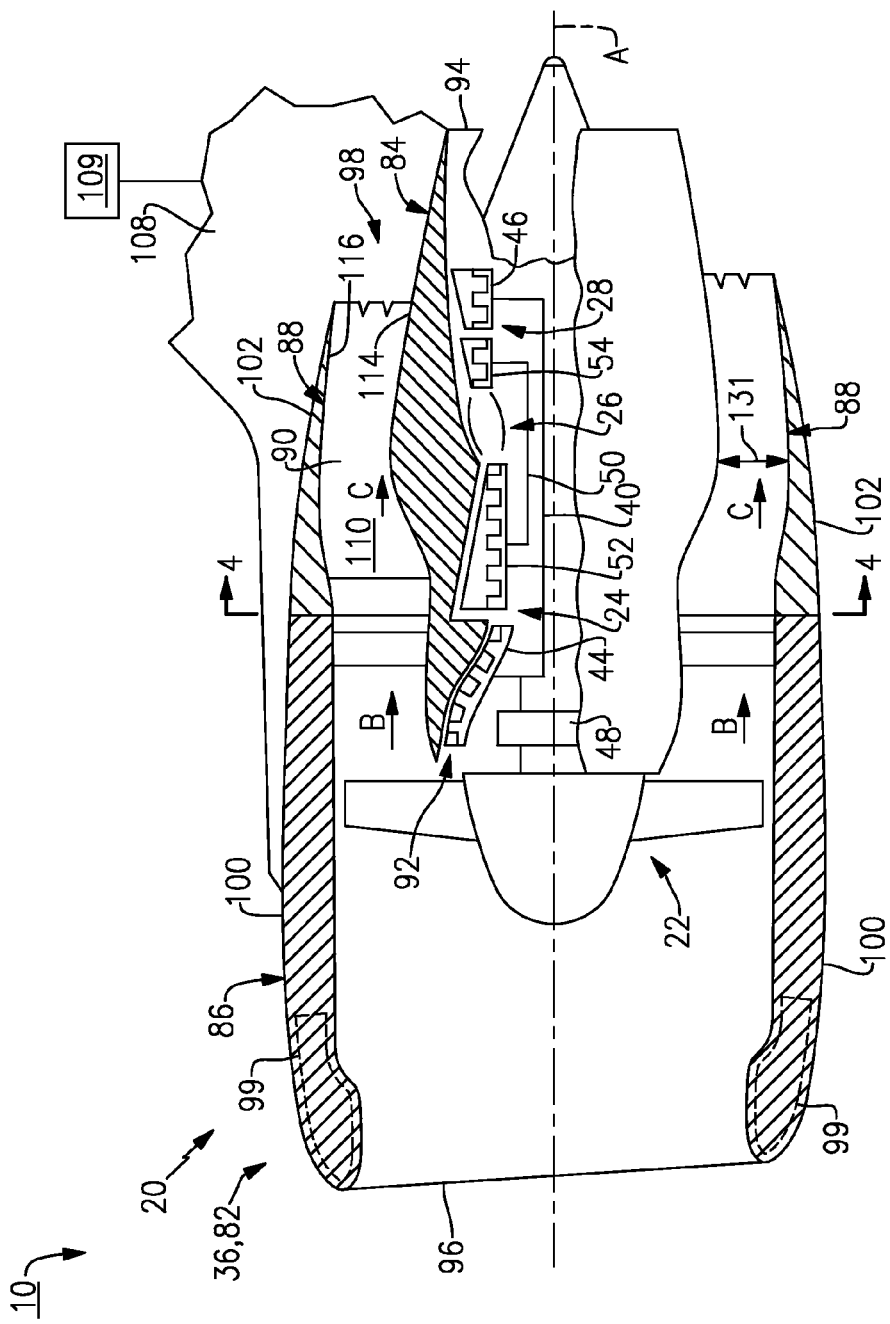
FIG. 3B is a side cutaway view of the engine casing of FIG. 3A in a stowed position.

Referring to FIGS. 3A, 3B and 4, a nacelle assembly or engine casing 82 of the integrated propulsion system 10 includes a core nacelle or cowling 84, a fan nacelle 86, a duct 88 and a bifurcation 90. As will be discussed below, the nacelle assembly or engine casing 82 is designed based in part on the various competing operating and design requirements of the engine 20, pylon 108, and aircraft structure 109 to improve the overall efficiency and performance of the system.

The core cowling 84 for the integrated propulsion system 10 extends circumferentially around and at least partially houses the engine sections 24, 26 and 28 and, where applicable, the cowling 84 extends circumferentially around and houses the geared architecture 48. The core cowling 84 extends axially along the longitudinal axis A between an inlet 92 of the core flowpath ("core inlet") and a nozzle 94 of the core flowpath ("core nozzle") downstream of the inlet 92.

The fan nacelle 86 for the integrated propulsion system 10 extends circumferentially around and houses the fan 42 and at least a portion of the core cowling 84, thereby defining the bypass flowpath B. The fan nacelle 86 extends axially along the longitudinal axis A between an airflow inlet 96 and a bypass nozzle 98 of the bypass flowpath B ("bypass nozzle") downstream of the inlet 96. In some embodiments, the fan nacelle 86 is a slim-line nacelle.

The fan nacelle 86 defines a highlight diameter 87 extending radially at an inlet lip 91 of inlet 96, and defines a maximum diameter 89 in a radial direction. The highlight diameter is measured at the maximum axial extent of the inlet lip 91 relative to the engine axis A. In some embodiments, a ratio of the highlight diameter 87 to the maximum diameter 89 is greater than or equal to about 0.80, or greater than or equal to about 0.90, although other ratios are contemplated. The slim-line nacelle configuration of the integrated propulsion system 10 reduces aerodynamic drag and other loads exerted on the engine 20, engine pylon 108 and or mounting arrangements, and the various aircraft structure, for example.

Figure 3C:
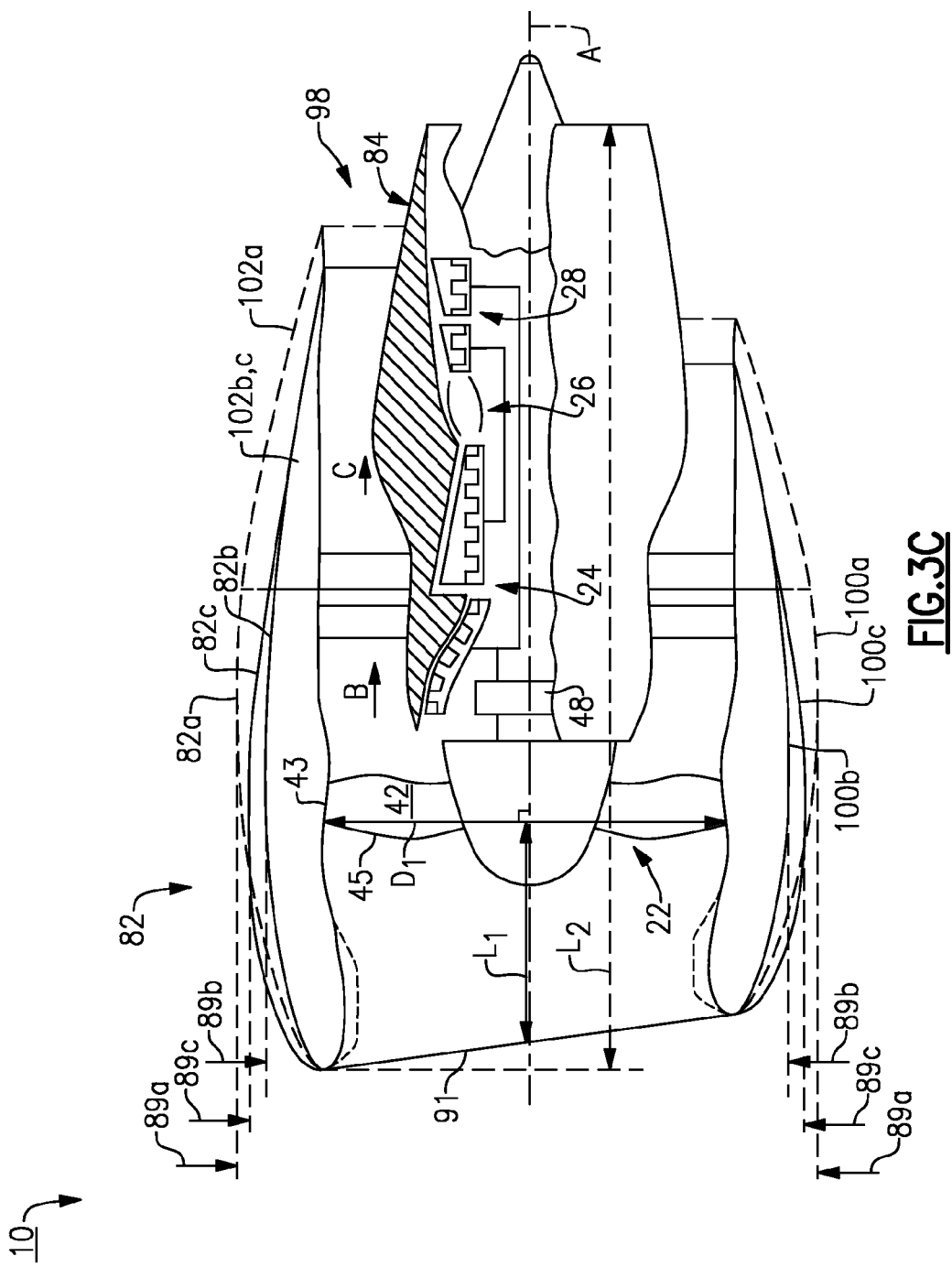
FIG. 3C is a side cutaway view of nacelle assembly arrangements for a gas turbine engine.

Referring to FIG. 3, a geometry of the nacelle assembly 82 can selected to affect the overall propulsive efficiency of the integrated propulsive system 10, and can be utilized for a gas turbine engine, such as engine 20 shown in FIG. 1. For example, the nacelle assembly can be configured as a laminar flow nacelle or a slim line nacelle, as discussed below and indicated by nacelle assemblies 82a, 82b and 82c, having various nacelle thicknesses or profiles. The nacelle assembly can also be arranged to have a relatively short inlet, further improving aerodynamic performance of the integrated propulsive system 10 as discussed in detail below.

The nacelle assembly can be a laminar flow nacelle as illustrated by nacelle assembly 82a (shown in dashed lines) or a slim line nacelle as illustrated by nacelle assembly 82b. The maximum diameter 89a of the laminar flow nacelle 82a is relatively greater than the maximum diameter 89b of the slim line nacelle 82b, which is defined at a location axially aft of the maximum diameter 89a. Nacelle assembly 82c illustrates a laminar flow nacelle in which the design parameters of the nacelle assembly 82c are constrained by one or more predetermined design requirements of a pylon 108 (shown in FIGS. 3A and 3B), causing the maximum diameter 89c to be defined axially forward of maximum diameter 89a.

The nacelle assembly 82 can also be configured to have a relatively short inlet to improve aerodynamic performance. Fan blades 42 establish a diameter between circumferentially outermost edges 43 of the fan blades 42 corresponding leading edge 45. The fan diameter $D_1$ is shown as a dimension extending between the edges 43 of two of the fan blades 42 that are parallel to each other and extending in opposite directions away from the central axis A. A length $L_1$ is established between inlet lip 91 at the central axis A and an intersection of a plane defining the fan diameter $D_1$, with the plane being generally perpendicular to the central axis A.

The length $L_1$ and the fan diameter $D_1$ are selected based in part on the arrangement of other components of the integrated propulsion system 10. In some embodiments, the dimensional relationship of $L_1/D_1$ (e.g., the ratio of $L_1/D_1$) is between about 0.2 and about 0.45, and in further embodiments is between about 0.25 and about 0.45, or between about 0.30 and about 0.40. The dimensional relationship of $L_1/D_1$ is smaller than that found on typical gas turbine engines. Providing a shorter inlet portion length $L_1$ facilitates reducing the weight of the engine assembly, and also reduces the overall length of the nacelle assembly 82 and reduces external drag. Additionally, having a shorter inlet reduces the bending moment and corresponding load on the engine structure during flight conditions.

The nacelle assembly 82 can also be configured to have a relatively compact overall arrangement or envelope. The nacelle assembly 82, such as fan nacelle 86, establishes a maximum diameter 89 in a radial direction as previously discussed. The nacelle assembly 82 establishes a length $L_2$ extending from a forward most portion of inlet lip 91 relative to the engine axis A to an aftmost portion of the nacelle assembly 82, such as core cowling 84. In some embodiments, the dimensional relationship of $L_2$ to maximum diameter 89 (e.g., the ratio of $L_2$ over maximum diameter 89) is between about 1.2 and about 1.5, and in further embodiments is between about 1.25 and about 1.35.

Referring back to FIGS. 3A and 3B, in some embodiments of the integrated propulsion system 10, the fan nacelle 86 includes a stationary forward portion 100 and an aft nacelle 102. The aft nacelle 102 is moveable relative to the stationary forward portion 100, and for example, is configured to selectively translate axially along a supporting structure such as a plurality of guides or tracks 104 (FIG. 3A). The tracks 104 may be connected to opposing sides of an engine mounting configuration or support structure 106, which may be configured as part of, or attached to, an engine pylon 108 that mounts the turbine engine 20 to an aircraft airframe, such as an aircraft wing or fuselage. In some embodiments, the aft nacelle 102 includes a noise attenuating nozzle which may have various noise attenuating materials or may have one or more serrations 93 (FIG. 3A) defining a trailing edge of the bypass nozzle 98.

As seen in FIG. 4, the bifurcation 90 extends radially between the core cowling 84 and the fan nacelle 86. In some embodiments, the bifurcation 90 is circumferentially aligned with and at least partially receives the engine support structure 106. The bifurcation 90 is positioned radially between the engine axis A and the pylon 108, and may be referred to as an upper bifurcation, or upper "bifi". The bifurcation 90 is not limited to any particular spatial orientations, and may alternatively be located within a gravitational side or bottom portion of the duct 88. The bifurcation 90 extends radially between the core cowling 84 and the fan nacelle 86 through the bypass flowpath B, thereby bifurcating the bypass flowpath B. The bifurcation 90 is aerodynamically contoured to define a portion of the bypass flowpath B, and in some embodiments, defines at least a portion of the support structure 106.

In the integrated propulsion system of FIG. 4, only an upper bifi is utilized. Load sharing normally associated with an upper and lower bifi has to be managed with the omission of the lower bifi, as would be appreciated by one of ordinary skill reading this disclosure. Such a configuration, however, reduces aerodynamic drag of using both an upper and lower bifi. Thus, the solution of a single bifi in the illustrated integrated propulsion system 10 derives certain advantages over a multi-bifi system.

A radially inner portion of the duct 88 is bounded by at least a portion of the core cowling 84. A radially outer portion of the duct 88 is bounded by the aft nacelle 102. The duct 88 is bounded in the circumferential direction by the bifurcation 90 to define a bypass duct portion for the illustrated integrated propulsion system 10, which defines at least an aft portion C of the bypass flowpath ("aft flowpath portion"). In some embodiments, the aft flowpath portion C is substantially uninterrupted by bifurcation(s) and/or support structure(s) other than the bifurcation 90 and/or the support structure 106. The flow path circumferentially defines an angle Θ between opposing surfaces 110 and 112 of the bifurcation 90 as measured, for example, at a widest portion of the bifurcation 90 within the duct 88. In some embodiments, the angle Θ is greater than or equal to about 180 degrees. In other embodiments, the angle Θ is greater than or equal to about 320 degrees, although other circumferential bounds of the aft flowpath portion C are contemplated.

The aft flowpath portion C extends axially within the aft nacelle 102 to the bypass nozzle 98 (shown in FIGS. 3A and 3B). The aft flowpath portion C extends radially between a radial outer surface 114 of the core cowling 84 and a radial inner surface 116 of the aft nacelle 102. Although a bypass duct portion having a single bifurcation in the circumferential direction, sometimes referred to as an "O-duct," is disclosed for the illustrated integrated propulsion system 10, it should be appreciated that other duct arrangements are contemplated, including D-duct arrangements having two bifurcations (e.g., extending less than or equal to about 180 degrees around a longitudinal axis A).

Figure 5A:
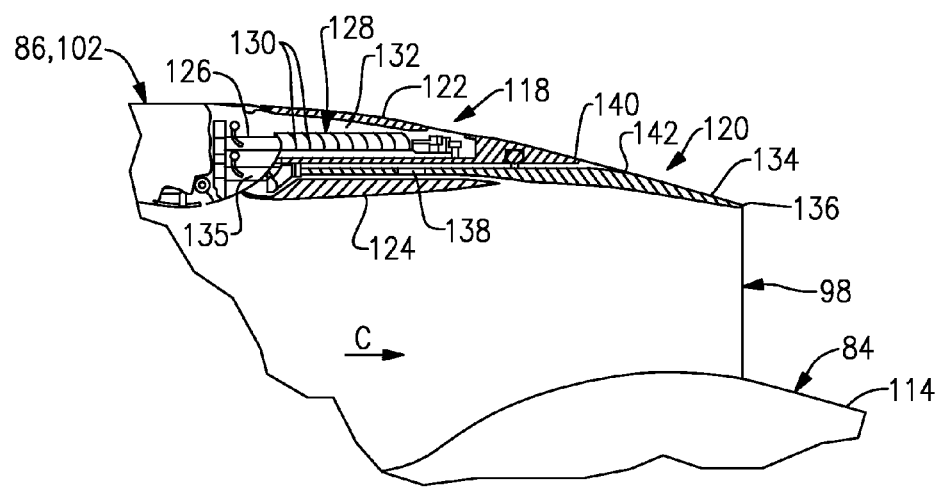
FIG. 5A is a partial cross section view of a thrust reverser and a variable area nozzle in stowed positions.
Figure 5B:
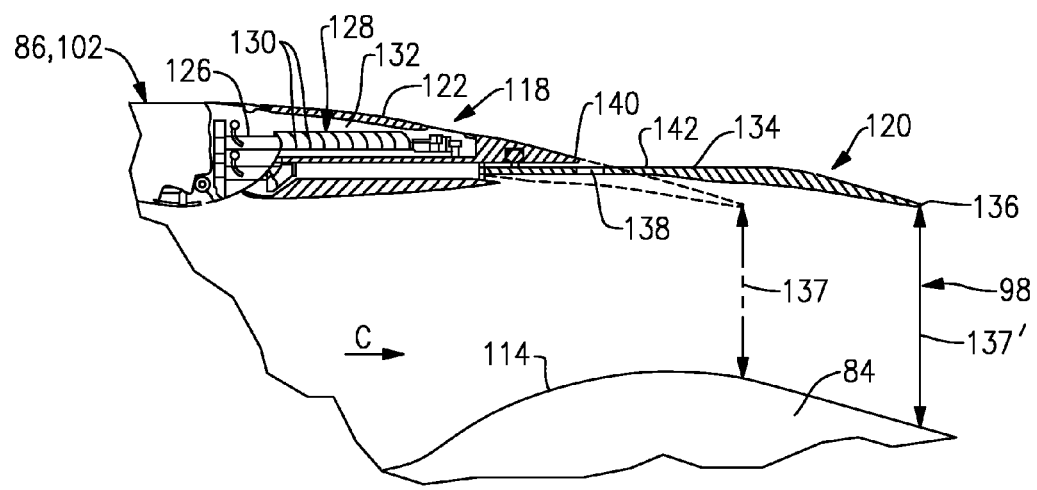
FIG. 5B is a partial cross section view of the thrust reverser of FIG. 5A in the stowed position and the variable area nozzle of FIG. 5A in a deployed position.
Figure 5C:
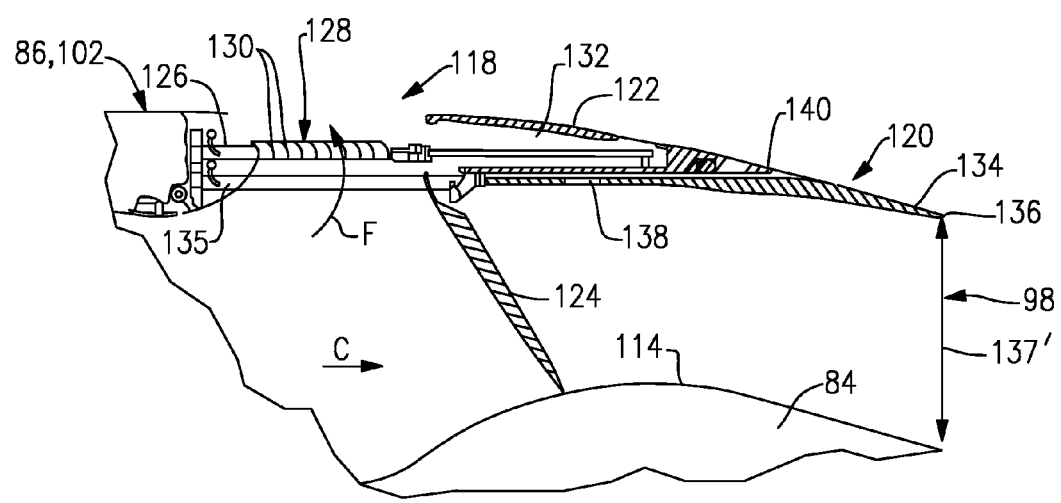
FIG. 5C is a partial cross section view of the thrust reverser and the variable area nozzle of FIG. 5A in deployed positions.

Referring to FIGS. 5A-5C, the engine casing 82 in some embodiments of the integrated propulsion system 10 includes at least one thrust reverser 118 and/or a variable area nozzle (VAN) 120, sometimes referred to as a variable area fan nozzle (VAFN), for adjusting various characteristics of the bypass flow. FIG. 5A illustrates the thrust reverser 118 and the variable area nozzle 120 in stowed positions. FIG. 5B illustrates the thrust reverser 118 in the stowed position and the variable area nozzle 120 in a deployed position. FIG. 5C illustrates the thrust reverser 118 in a deployed position and the variable area nozzle 120 in stowed position. The thrust reverser 118 includes a thrust reverser body 122, which is configured with the aft nacelle 102. In some embodiments, the thrust reverser 118 includes one or more blocker doors 124, one or more actuators 126, and/or one or more cascades 128 of turning vanes 130 arranged circumferentially around the longitudinal axis A.

The thrust reverser body 122 for the integrated propulsion system 10 may have a generally tubular geometry with an axially extending slot or channel configured to accommodate the support structure 106 (shown in FIGS. 3A-3B). The thrust reverser body 122 includes at least one recess 132 that houses the cascades 128 and the actuators 126 when the thrust reverser 118 is in the stowed position. Each blocker door 124 is pivotally connected to the thrust reverser body 122. The actuators 126 are adapted to axially translate the thrust reverser body 122 between the stowed and deployed positions. As the thrust reverser body 122 translates aftwards, the blocker doors 124 pivot radially inward into the aft flowpath portion C and divert at least some or substantially all of the bypass air as flow F through the cascades 128 to provide the reverse engine thrust.

Other thrust reverser configurations are contemplated for the integrated propulsion system 10. In some embodiments, the cascades 128 are configured to translate axially with a respective thrust reverser body 122. In other embodiments, the thrust reverser body 122 and/or cascades 128 include one or more circumferential segments that synchronously or independently translate or otherwise move between deployed and stowed positions.

Referring back to FIGS. 3A and 3B, in some embodiments of the integrated propulsion system 10, the thrust reverser 118 is configured without blocker doors. Opposing surfaces 114, 116 of the core cowling 84 and/or aft nacelle 102 may include one or more contoured segments to define a radial distance 131. As the aft nacelle 102 translates aftwards, the radial distance 131 of the aft flowpath portion C may change (e.g., reduces) to a radial distance 131' to partially or fully obstruct the bypass flowpath B to divert flow through the cascade 128 (shown in dashed lines at the bottom of FIG. 3A) to provide the reverse engine thrust.

Referring to FIGS. 5A to 5C, the variable area nozzle 120 for the illustrated integrated propulsion system 10 includes a nozzle body 134 and one or more actuators 135. The nozzle body 134 is configured with the aft nacelle 102, and is arranged radially within and may nest with the thrust reverser body 122. The nozzle body 134 may have a generally tubular geometry with an axially extending slot or channel configured to accommodate the support structure 106 (shown in FIGS. 3A-3B). The actuators 135 are configured to axially translate the nozzle body 134 between the stowed position of FIG. 5A and the deployed position of FIG. 5B. As the nozzle body 134 translates aftwards, a radial distance 137 of the bypass nozzle 98 between a trailing edge or aft end 136 of the fan nacelle 86 and the core cowling 84 may change (e.g., increase) and thereby change (e.g., increase) a flow area of the bypass nozzle 98. In this manner, the variable area nozzle 120 may adjust a pressure drop or ratio across the bypass flowpath B (see FIGS. 3A and 3B) by changing the flow area of the bypass nozzle 98.

In some embodiments, the variable area nozzle 120 defines or otherwise includes at least one auxiliary port 138 to affect the bypass flow. In some embodiments, the auxiliary port 138 is defined between an upstream portion 140 of the aft nacelle 102 and the nozzle body 134 of the variable area nozzle 120 as the nozzle body 134 translates axially aftwards. A flow area through the auxiliary port 138 augments the flow area of the bypass nozzle 98, thereby increasing an effective flow area of the variable area nozzle 120. The variable area nozzle 120 for the illustrated integrated propulsion system 10 therefore may adjust a pressure drop or ratio across the bypass flowpath B while translating the nozzle body 134 over a relatively smaller axial distance. Other variable area nozzle configurations are contemplated. In some embodiments, the variable area nozzle 120 includes one or more bodies (e.g., flaps) that may move radially (or axially and radially) to change the flow area of the bypass nozzle 98.

Figure 6A:
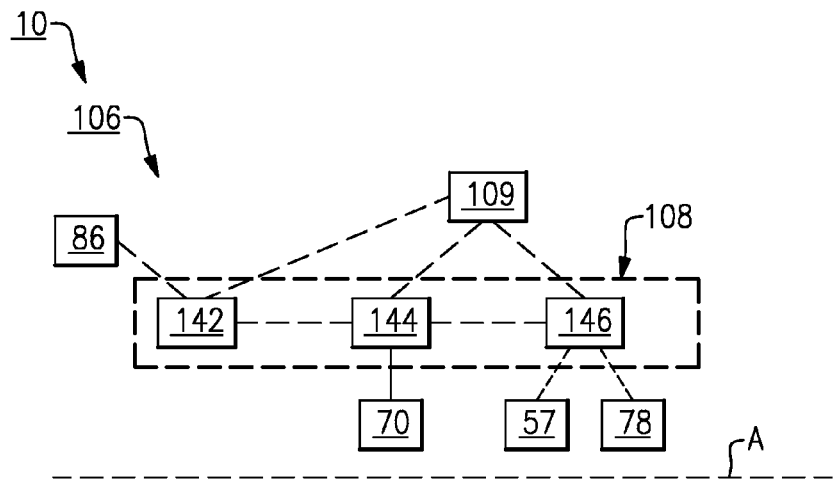
FIG. 6A is a schematic view of an engine support structure.

As will now be further disclosed, the engine support structure 106 (FIG. 6A) of the pylon 108 for the illustrated integrated propulsion system 10 is designed to counteract the various loads and forces observed during aircraft operation. FIG. 6A illustrates a highly schematic view of an engine support structure 106 according to an embodiment of the integrated propulsion system 10. The engine support structure 106 includes a forward mount 142, an intermediate mount 144, and an aft mount 146. The forward mount 142 is attachable to at least one of a fan nacelle 86, another portion of a pylon 108 and an aircraft interface or structure 109. The intermediate mount 144 is attachable to an intermediate case 70.

In one embodiment, the aft mount 146 is attachable to a turbine exhaust case 78. In another embodiment, the aft mount 146 is attachable to a mid-turbine frame 57. Attaching the aft mount 146 to the mid-turbine frame 57 generally increases ground clearance by moving portions of the engine 20 relatively closer to the aircraft wing. In some embodiments, at least one of the intermediate mount 144 and the aft mount 146 is attachable to another portion of the pylon 108 or aircraft structure 109. In one embodiment, the forward mount 142 is attachable to the intermediate mount 144, and in another embodiment, the intermediate mount 144 is attachable to the aft mount 146.

Figure 6B:
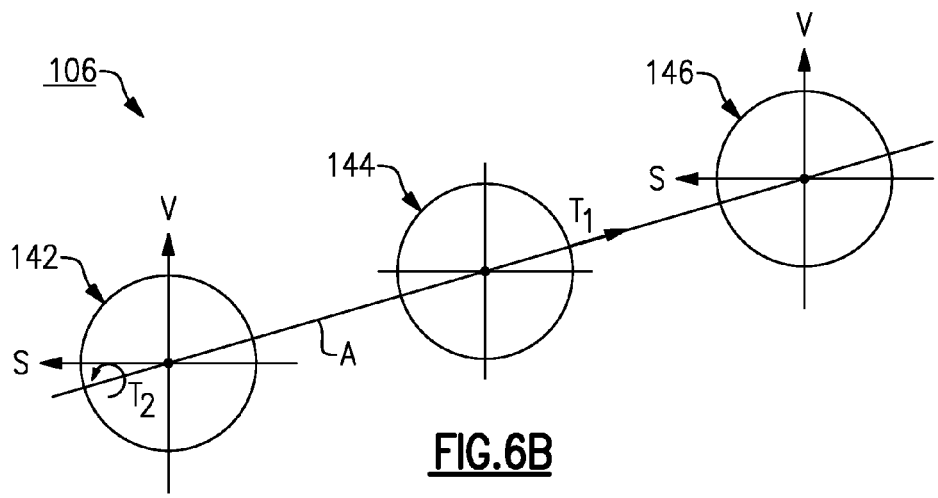
FIG. 6B is a free body diagram illustrating loads reacted by the engine support structure of FIG. 6A according to a first embodiment.

FIG. 6B illustrates a free body diagram of an engine support structure 106' for the integrated propulsion system 10, with an aft mount 146 attachable to a turbine exhaust case 78, and which is configured to react to at least vertical loads V, side loads S, thrust loads $T_1$, and torsional loads $T_2$. In some embodiments, the forward mount 142 is configured to react to at least one or more vertical loads V, one or more side loads S and torsional loads $T_2$ relative to the engine axis A. The intermediate mount 144 is configured to react to at least a thrust load $T_1$ along the engine axis A. The aft mount 146 is configured to react to at least a vertical load V and one or more side loads S. In one example embodiment, only the forward mount 142 is configured to react to torsional loads $T_2$. The forward mount 142 is configured to react to torsional loads $T_2$ which for bypass duct portions having a single bifurcation may be observed relatively forward along the engine axis A as compared to D-duct arrangements.

Figure 6C:
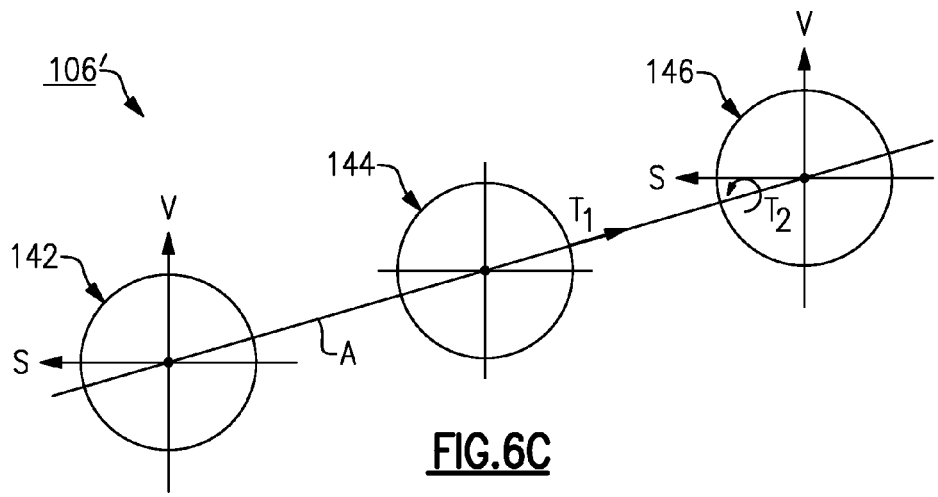
FIG. 6C is a free body diagram illustrating loads reacted by the engine support structure of FIG. 6A according to a second embodiment.

FIG. 6C illustrates a free body diagram of an engine support structure 106' for the integrated propulsion system 10, with an aft mount 146 attachable to a mid-turbine frame 57. In this arrangement, a forward mount 142 is configured to react to at least one or more vertical loads V and one or more side loads S. An intermediate mount 144 is configured to react at least a thrust load $T_1$ along the engine axis A. The aft mount 146 is configured to react to at least a vertical load V and one or more side loads S. The aft mount 146 is also configured to react to torsional loads $T_2$ relative to the engine axis A. In an embodiment, only the aft mount 146 is configured to react to torsional loads $T_2$. This technique may be utilized, for example, in combination with engines having relatively high bypass ratios, such as any of the bypass ratios of this disclosure.

The engine support structures 106, 106' for the integrated propulsion system 10 react to two or more vertical loads, two or more side loads, thrust loads and torsional loads, and are therefore referred to as "determinate systems." However, it should be appreciated that the engine support structures 106, 106' may be configured to react to additional loads, sometimes referred to as indeterminate systems. The engine support structures 106, 106' reduce the amount of backbone bending in the engine 20 at various points in the case structure 66, which may be caused in part by the arrangement of the bypass duct portion with respect to the engine axis A. This reduces blade tip clearance requirements in the compressor section 24 and/or turbine section 28, for example.

As illustrated by FIGS. 6A to 6C and discussed above, the engine support structures 106, 106' are designed holistically as part of the integrated propulsion system 10. In particular, the selection of locations of the various mount points and which loads to react at the various mount points is determined based in part on the operating and design requirements of the related engine 20 (FIGS. 1 and 1A), nacelle assembly 82 (FIGS. 3A to 4) and aircraft structure 109. Loads are therefore reacted more optimally than prior segmented or disjoined mounting techniques.

The engine support structures 106, 106' in the illustrated integrated propulsion system 10 are arranged in a manner that considers the requirements and optimization of the nacelle assembly 82, including the bypass duct portion 88 and associated aerodynamic loads and other forces. The resulting configuration reduces overall packaging requirements of the engine and other related external devices. This improves overall aerodynamic efficiency of the nacelle assembly 82, increasing propulsive efficiencies and reducing fuel burn.

For example, as the above disclosed integrated propulsion system 10 that utilizes a single bifi, the external devices can be moved inward, e.g., into the upper bifi, and are therefore arranged more compactly relative to the engine. With such placement and compact design, the impact of their associated loads can be reduced. That is, their loads can be more effectively transferred to, and through, the bifurcation 90 and engine support structures 106, 106', and other portions of the pylon 108. The example integrated propulsion system 10 therefore desirably leads to higher overall system performance in terms of size, weight and efficiency.

Although the various embodiments and example engine 20, nacelle assembly 82 and the engine support structures 106, 106' of the pylon 108 are discussed with a geared architecture 48, it should be appreciated that, as indicated above, the engine support structures 106, 106' and other features of this disclosure extends to non-geared or direct drive engines. The engine support structures 106, 106' and other features of this disclosure may also be applied to other gas turbine engine architectures, including direct drive turbofans, single spool configurations, and configurations having more than two spools (i.e., low spool, intermediate spool and high spool), and also assemblies configured with various duct arrangements, including bypass duct portions having a single bifurcation and D-duct configurations.

The various methods of designing an integrated propulsion system 10, including a turbofan gas turbine engine 20 and a nacelle assembly 82, according to bypass ratios equal to or greater than about 5, greater than or equal to about 8, or equal to or greater than about 10, or equal to or greater than about 12, overall pressure ratios greater than or equal to about 35, or equal to or greater than about 50, and fan pressure ratios equal to or less than about 1.70, or equal to or less than about 1.80, are designed together in a holistic and integrated manner to realize various synergistic benefits. Various synergies can be realized by further designing an engine 20, a nacelle assembly 82, and a pylon 108 together in an integrated manner. Other synergies can be realized by further designing an engine 20, a nacelle assembly 82, a pylon 108 and a thrust reverser 118 together in an interactive design process.

Figure 7A:
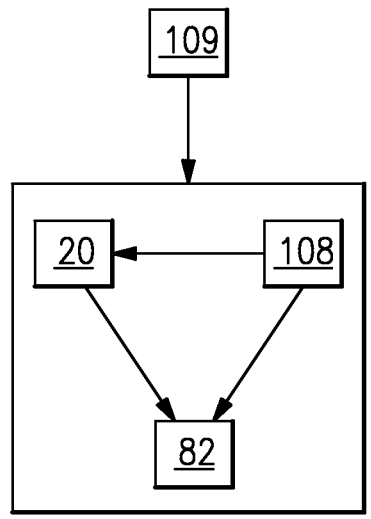
FIG. 7A illustrates a prior process for designing a propulsive system.

FIG. 7A illustrates designing a propulsive system in a prior process. As shown in FIG. 7A, prior propulsive systems are designed in a hierarchical manner, in which the design requirements of an aircraft structure 109 drive the requirements of an engine 20, pylon 108 and nacelle assembly 82. The design requirements of the engine 20 depend on the design requirements of the pylon 108, and the design requirements of the nacelle assembly 82 depend on the design requirements of both the pylon 108 and the engine 20. In this manner, the engine 20, nacelle assembly 82, pylon 108 and aircraft structure 109 are not designed to improve the overall performance of the propulsion system.

Figure 7B:
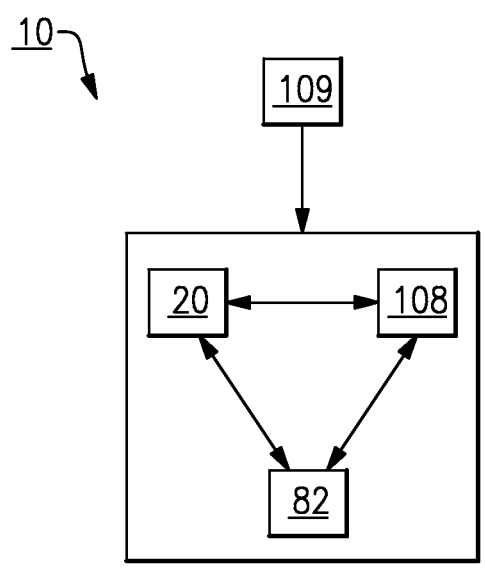
FIG. 7B illustrates an interactive process for designing a propulsive system.

FIG. 7B illustrates a process for designing an integrated propulsive system 10 in an interactive process. As shown, the design requirements of the engine 20, nacelle assembly 82, pylon 108 and aircraft structure 109 are selected in an interactive and interdependent manner to improve the overall performance of the propulsion system 10, utilizing any of the techniques discussed herein. For example, the interactive process includes identifying two or more of internal structural loading requirements, external structural mount loading requirements, aerodynamic requirements, and acoustic requirements for the system, and interdependently designing the components to meet the requirements. Other design and operating requirements can be utilized in the interactive process, such as fuel consumption, or aircraft type such as short-range, mid-range or long-range models.

For example, the design of the pylon 108 can be based on considering the interface(s) with the engine 20, the aircraft structure 109, or loads between the engine 20 and the aircraft wing or structure 109. The design of the engine 20 can be based upon the arrangement of the engine case structure 66, the definition of hard points or arrangement of external components such as engine controls, plumbing or the like, which in part define or drive nacelle diameter and aerodynamic lines of the nacelle assembly 82. The design of the engine 20 can also be based upon the location of the mount planes, which depend on mount interfaces, or upon the use of subsystems such as an environmental control system (ECS), generator(s), oil or hydraulic pumps and the like.

Similarly, design of the nacelle assembly 82 can be based upon the aerodynamic lines of the nacelle assembly 82, such as the selection of the nacelle to define a relatively short or long bypass duct, or the selection of the nacelle to have a laminar flow inlet or a slim line nacelle. In addition, the nacelle assembly 82 can be designed based on structural considerations, such as the arrangement or configuration of a thrust reverser or variable area fan nozzle (VAFN), the number of bifurcations used in the nacelle design, and duct type for the bypass duct or mount point interfaces, for example. Furthermore, the nacelle design can be based on a ratio of nacelle inlet to nacelle diameter, utilizing techniques identified in this disclosure, to determine the loads between the nacelle assembly 82 and the engine 20, such as engine back-bone bending, for example.

The various synergies include weight reductions relative to prior propulsion systems designed in a segregated or hierarchical manner. Weight reductions may be achieved by designing at least the gas turbine engine 20 and the nacelle assembly 82 together, or also the pylon 108 and/or aircraft structure 109 together, in an integrated manner, including any of the techniques discussed herein.

Weight reduction may be achieved by configuring the nacelle assembly 82 to have a bypass duct portion with a single bifurcation 90, as discussed above. This technique eliminates one or more bifurcations and supporting structure utilized in prior designs. The single bifurcation 90 is realized in part by designing the pylon 108 together with the nacelle assembly 82, enabled in part by a mounting assembly, such as engine support structures 106, 106', configured to react to various loads applied to the integrated propulsion system 10 as previously discussed. The configuration of the mounting assembly is based in part on the vertical, side, torsional and thrust loads relative to the arrangement of the engine 20 and the nacelle assembly 82.

Configuring the nacelle assembly 82 and pylon 108 in this manner enables the efficient packaging of various engine external components in a more efficient manner, such as an oil pump, thermal management system, environmental control system, or another component driven by an auxiliary gearbox, for example. Packaging of the external engine components may be considered in an integrated manner in combination with the configuration of the mounting assembly including engine support structures 106, 106' to efficiently react to the various loads observed during engine operation and provide greater engine stability. The external engine components may be located axially forward or aft of the geared architecture 48 based in part on the arrangement of the mounting assembly, and in turn, the mounting assembly may be configured based on the location of the external engine components in an integrated and holistic manner.

Attaching the engine support structure 106 at the mid-turbine frame 57 further simplifies the arrangement of the turbine exhaust case 78, which may be configured as a non-structural component. Configuring the turbine exhaust case 78 as a non-structural component reduces part counts and the overall weight of the case structure 66 and the integrated propulsion system 10.

Additional weight reduction and reliability can be achieved as compared to prior propulsion systems, by designing the nacelle assembly 82 to include a fan or hardwall containment case 60. As illustrated in FIG. 1, the fan section 22 includes a fan blade or hardwall containment system 60 (shown schematically) arranged about the engine axis A and spaced radially from the fan blades 42. The hardwall containment system 60 is configured to contain, and absorb the impact of, a fan blade 42 separating from a fan hub 41 or a fragment thereof. In some embodiments, the hardwall containment system 60 is a hard ballistic liner applied to the nacelle or fan case 15. The hard ballistic liner can include a rigid material such as a resin impregnated fiber structure, metallic structures, or ceramic structures. However, other materials and structures of the hardwall containment system 60 are contemplated.

Figure 2:
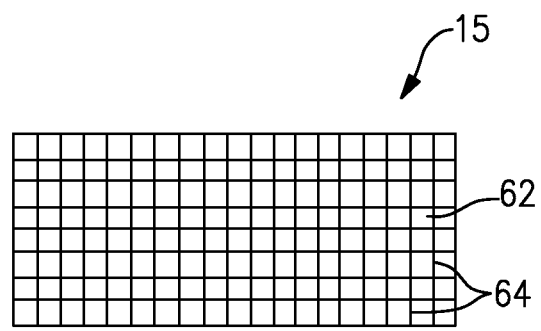
FIG. 2 illustrates a cross section view of a portion of a nacelle.

Further weight reductions may be realized by configuring the nacelle assembly 82 and/or hardwall containment case 60 to include various composite materials that may be selected in part based on the arrangement of the integrated propulsion system 10. As illustrated schematically in FIG. 2, the fan case or nacelle 15 is made of an organic matrix composite. The organic matrix composite can include a matrix material 62 and reinforcement fibers 64 distributed through the matrix material 62. The reinforcement fibers 64 may be discontinuous or continuous, depending upon the desired properties of the organic matrix composite, for example. The matrix material 62 may be a thermoset polymer or a thermoplastic polymer. The reinforcement fibers 64 may include carbon graphite, silica glass, silicon carbide, or ceramic, metal, for example, depending, for example, on rigidity goals. Given this description, one of ordinary skill in the art will recognize that other types of matrix materials and reinforcement fibers may be used.

Further weight reductions and propulsive efficiencies may be realized by configuring the fan blades 42 to include lightweight materials. Various lightweight materials can include, but are not limited to, aluminum and composite materials. Various composite materials can include, but are not limited to, two dimensional or three-dimensional composites such as carbon fiber lay-ups or three-dimensional woven carbon fiber and the like. The composite may be formed from a plurality of braided yarns such as carbon fibers. Other materials can be utilized, such as fiberglass, Kevlar®, a ceramic such as Nextel™, and a polyethylene such as Spectra®. The composite can be formed from a plurality of uni-tape plies or a fabric. The fabric can include woven or interlaced fibers, for example.

Figure 8:
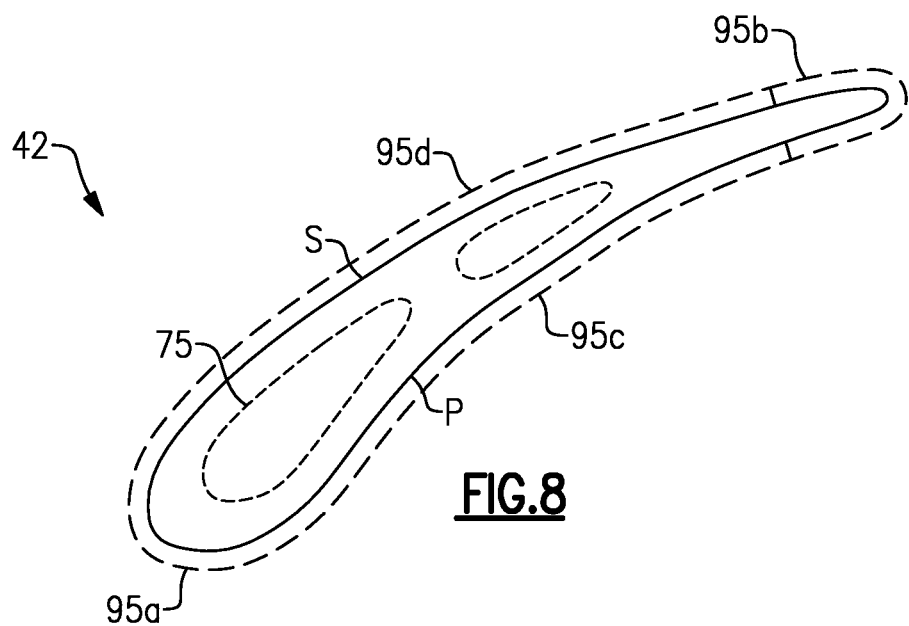
FIG. 8 is a cross-sectional view of a fan blade according to an embodiment.

The fan blades 42 may include one or more cores 75, as shown in FIG. 8 which is a schematic cross-section of the fan blade in FIG. 1 through line 8-8. The core 75 can be made from a foam or other lightweight material such as polyurethane. Other materials can be utilized, such as metallic foam and polymethacrylimide (PMI) foam sold under the trade name Rohacell®. The core 75 can be formed from a composite made of one or more plies of fabric or from braided yarns. In alternative embodiments, the fan blades 42 are free of a core. The fan blades 42 can include a sheath 95 located on an exposed surface, such as core 95a at a leading edge or core 95b at a trailing edge of the fan blade 42. A sheath 95 can be located at other positions, such as sheath 95c along a pressure side P or sheath 95d along a suction side S of the fan blade 42. Various materials of the sheath can be utilized, such as titanium or another material, for example.

The overall aerodynamic performance of the integrated propulsion system 10 can be improved relative to prior propulsion systems. Aerodynamic efficiencies may be achieved by designing at least a gas turbine engine 20 and a nacelle assembly 82 together, or also the pylon 108 and/or aircraft structure 109 together, in an integrated manner.

Various techniques for designing the integrated propulsion system 10 to improve aerodynamic performance may be utilized. In some examples, the engine 20 and the nacelle assembly 82 are designed together with the aircraft structure 109, such as a wing or fuselage, to improve the overall aerodynamic interaction of these components. For example, the various axial, radial and/or circumferential locations of the mounts 142, 144, 146 with respect to the engine axis A may be selected based on the design and operating characteristics of the engine 20 and nacelle assembly 82, including the various loads to be reacted to at the mounts 142, 144, 146, which may be considered together with other aerodynamic design considerations of the integrated propulsion system 10, such as the desired proximity of the nacelle assembly 82 to the aircraft structure 109.

Aerodynamic efficiencies may be achieved by configuring the nacelle assembly 82 to have a bypass duct portion with a single bifurcation 90, as discussed above. This technique eliminates one or more bifurcations and supporting structure utilized in prior designs, thereby improving bypass flow characteristics. The single bifurcation 90 is enabled in part by designing the pylon 108 together with the nacelle assembly 82, such as configuring engine support structures 106, 106' according to the various loads applied to the integrated propulsion system 10, as discussed above.

As previously discussed, attaching the engine support structure 106 at the mid-turbine frame 57 simplifies the arrangement of the turbine exhaust case 78. The turbine exhaust case 78 can be configured to be a non-structural component. In this manner, the turbine exhaust case 78 can be designed to improve the flow characteristics of the bypass flow path and to increase the overall aerodynamic efficiency of the case structure 66 and the integrated propulsion system 10.

The overall aerodynamic efficiency and noise characteristics of the integrated propulsion system 10 can be further improved by configuring the nacelle assembly 82 to include a slim-line nacelle. As previously discussed, the slim-line nacelle defines a maximum diameter and having an inlet lip defining a highlight diameter. A ratio of the highlight diameter to the maximum diameter can be greater than or equal to about 0.65, thereby reducing weight and drag penalties typically associated with nacelles having a "thick" inlet lip. For example, the ratio of the highlight diameter to the maximum diameter can be between about 0.8 and less than 1, where the range floor could alternatively be 0.85 and the range ceiling could be 0.90 or 0.95. For example, the nacelle assembly 82 is configured having a laminar flow nacelle, such that the ratio of highlight diameter to maximum diameter is between about 0.80 and about 0.83. These arrangements provide a relatively efficient aerodynamic profile of the integrated propulsion system 10 by reducing flow separation about the nacelle. The location of the mounting arrangement, including mounts 142, 144, 146, can be selected based on the desired aerodynamic characteristics and spatial arrangement of the nacelle.

The nacelle assembly 82 can include various passive or active boundary layer control functionality to reduce drag penalty and increase propulsive efficiency. The nacelle assembly 82 can include a transitional nacelle having inlet lip which is selectively moveable or controlled between a first position 91 and a second position 91' (shown schematically in FIG. 3A) during various operational conditions, thereby varying the ratio of highlight diameter to maximum diameter. The geometry of the inlet lip 91, 91' can be varied to include any of the ratios or values previously discussed. Various actuation devices 97 can be utilized to vary a geometry of the nacelle assembly 82 during specific flight conditions, including one or more mechanical actuators or a shape memory alloy, for example.

The inlet lip can be fixed or passive, having any of the ratios of highlight diameter to maximum diameter previously discussed, to reduce flow separation and related drag penalties. The nacelle assembly 82 can include one or more flow assemblies 99 (shown schematically in FIG. 3B) operable to generate an amount of pressure or suction on exposed surfaces of the nacelle assembly 82 utilizing various techniques. In this manner, the flow assembly 99 reduces flow separation and increases propulsive efficiencies.

Other synergies may be achieved by design the various components of the integrated propulsion system 10 based in part on the desired operating characteristics of these components. The gas turbine engine 20 can be configured to further improve the overall efficiency and performance of the integrated propulsion system 10, such as configuring a fan drive turbine 46 to have pressure ratios greater than or equal to about 5 measured at cruise flight conditions, or more narrowly between about 5 and about 8. The arrangement of other components of the integrated propulsion system 10, such as the mounting assembly of the pylon 108, may be designed in part based on the pressure ratios of the fan drive turbine 46 to achieve additional synergies.

Figure 9:
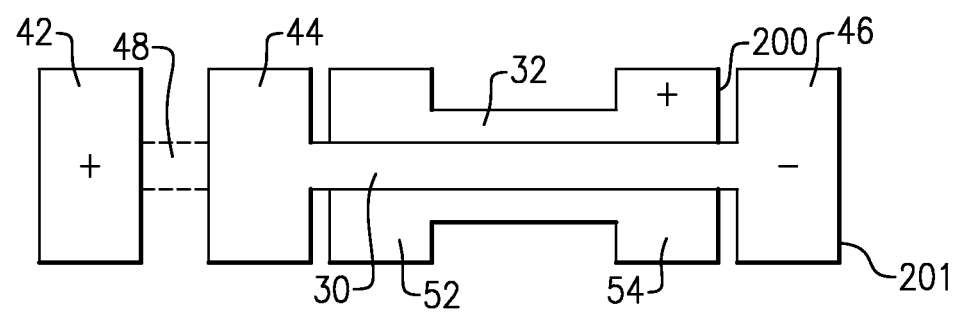
FIG. 9 schematically shows the arrangement of the low and high spool of FIG. 1, along with the fan drive.

Other structural, operational and configuration characteristics may be utilized in the iterative design process of achieving the noted pressure ratios. Structurally, an exit area 200 is shown, in FIGS. 1 and 9, at the exit location for the high pressure turbine section 54 is the annular area of the last blade of turbine section 54. An exit area for the low pressure turbine section is defined at exit 201 for the low pressure turbine section is the annular area defined by the last blade of that turbine section 46. Operationally, as shown in FIG. 9, the turbine engine 20 may be counter-rotating. This means that the low pressure turbine section 46 and low pressure compressor section 44 rotate in one direction ("−"), while the high pressure spool 32, including high pressure turbine section 54 and high pressure compressor section 52 rotate in an opposed direction ("+"). Configurationally, a gear reduction 48 may couple the low pressure turbine section 46 and the fan section 42. The gear reduction 48, which may be, for example, an epicyclic transmission (e.g., with a sun, ring, and star gears), is selected such that the fan 42 rotates in the same direction ("+") as the high spool 32. With this arrangement, and with the other structure as set forth above, including the various quantities and operational ranges, the stated pressure ratios can be achieved along with very high speeds for the low pressure spool.

Under certain circumstances, one may measure low pressure turbine section and high pressure turbine section operation according to a performance quantity that calculates the exit area for the turbine section multiplied by its respective speed squared. This performance quantity ("PQ") is defined as:

$$PQ_{lpt} = (A_{lpt} \times V_{lpt}^2) \qquad \text{Equation 1:}$$

$$PQ_{hpt} = (A_{hpt} \times V_{hpt}^2) \qquad \text{Equation 2:}$$

where $A_{lpt}$ is the area of the low pressure turbine section at the exit thereof (e.g., at 201), where $V_{lpt}$ is the speed of the low pressure turbine section, where $A_{hpt}$ is the area of the high pressure turbine section at the exit thereof (e.g., at 200), and where $V_{hpt}$ is the speed of the low pressure turbine section.

Thus, a ratio of the performance quantity for the low pressure turbine section compared to the performance quantify for the high pressure turbine section is:

$$(A_{lpt} \times V_{lpt}^2)/(A_{hpt} \times V_{hpt}^2) = PQ_{lpt}/PQ_{hpt} \qquad \text{Equation 3:}$$

$PQ_{lpt}/PQ_{hpt}$ ratios that provide a turbine section that is smaller than the prior art, both in diameter and axial length, and provide an efficiency of the overall engine that is greatly increased, and in one example can be obtained where areas of the low and high pressure turbine sections are designed as about 558 in² and about 91 in², respectively, and speeds of the low and high pressure turbine sections are designed to reach 10179 rpm and 24346 rpm, respectively.

That is, having $PQ_{lpt}/PQ_{hpt}$ ratios in the 0.5 to 1.5 range, or more narrowly, above or equal to about 0.75, 0.8, or 1.0, provide relatively efficient engines. In a direct drive engine, in which the gear reduction 48 is omitted, the ratio can be about 0.2 to about 0.4, or more narrowly between about 0.2 to about 0.3. Although FIG. 9 illustrates a two spool arrangement, other engine architectures can benefit from the teachings herein, including three spool arrangements.

The low pressure compressor section is also improved with this arrangement, and behaves more like a high pressure compressor section than a traditional low pressure compressor section. It is more efficient than the prior art, and can provide more compression in fewer stages. The low pressure compressor section may be made smaller in radius and shorter in length while contributing more toward achieving the overall pressure ratio design target of the engine.

Other design characteristics may also be considered in designing the integrated propulsion system 10, including any of the stage counts and pressure ratios of the compressor section 24 and turbine section 28 discussed herein. The pressure ratios, stage counts and spool speed ranges of the engine 20 may be considered and selected together in an integrated manner with the nacelle assembly 82, pylon 108 and aircraft structure 109 to improve the overall propulsive efficiency of the integrated propulsion system 10.

Other design considerations for the integrated propulsion system 10 include the torque profile of the various engine 20 components which may be considered in determining the position of each mount 142, 144, 146 of the support structure 106. The operating characteristics of the engine 20 components may be selected in part based on the location of the mount 142, 144, 146 relative to the engine 20 and the nacelle assembly 82.

The overall operating characteristics of the integrated propulsion system 10 can be further improved by designing a portion of the nacelle assembly 82, such as an aft nacelle 102. In some examples, the aft nacelle 102 includes a noise attenuating nozzle having at least one serration 93 defining a trailing edge, as previously discussed. In this configuration, the overall noise characteristics of the integrated propulsion system 10 can be further reduced while minimizing weight by reducing the need for noise attenuating materials or structures. In other examples, the noise attenuating nozzle is made of various noise attenuating materials. The materials can include sintered metal, ceramic foam, or a matrix including aramid fibers such as Kevlar®, or another suitable material, for example. The porosity, depth, and material characteristics of the noise attenuating materials may be selected for optimal impedance and thus optimal acoustic attenuation.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An integrated propulsion system comprising components that include a gas turbine engine and a nacelle assembly, the system designed by a process comprising identifying two or more of internal structural loading requirements, external structural mount loading requirements, aerodynamic requirements, and acoustic requirements for the system, and interdependently designing said components to meet said requirements, wherein:
   the nacelle assembly includes a fan nacelle arranged at least partially about a fan and an engine, and an aft nacelle moveable relative to a core cowling;
   the system includes a fan section at least partially defined by the fan nacelle, and the fan section has a fan pressure ratio of less than about 1.7;
   the engine includes a turbine section configured to drive the fan section and a compressor section, the compressor section includes a first compressor and a second compressor;
   an overall pressure ratio is provided by the combination of a pressure ratio across the first compressor and a pressure ratio across the second compressor, and wherein the overall pressure ratio is greater than or equal to about 35;
   the fan section is configured to deliver a portion of air into the compressor section, and a portion of air into a bypass duct defining a bypass flow path, and wherein a bypass ratio, defined as a volume of air passing to the bypass duct compared to a volume of air passing into the compressor section, is equal to or greater than about 5; and
   the aft nacelle is arranged at least partially about the core cowling to define an aft flowpath portion of the bypass flow path, the aft flowpath portion extending circumferentially between opposite sides of a single bifurcation positioned in the bypass duct such that the aft flowpath portion is uninterrupted by another bifurcation between the opposite sides.

2. The integrated propulsion system as recited in claim 1, comprising:
   a pylon attaching the nacelle assembly and the engine to an aircraft structure.

3. The integrated propulsion system as recited in claim 2, comprising a thrust reverser configured to selectively communicate air from the bypass duct.

4. The integrated propulsion system of claim 3, wherein the nacelle assembly is a slim-line nacelle, the slim-line nacelle defines a maximum diameter and having an inlet lip defining a highlight diameter, and a ratio of the highlight diameter to the maximum diameter is greater than or equal to about 0.80.

5. The integrated propulsion system as recited in claim 4, wherein the pylon includes a mounting assembly attachable to the nacelle assembly and the engine, the mounting assembly including a forward mount, an intermediate mount and an aft mount, wherein:
   the forward mount is configured to react to at least a vertical load, a first side load and a torsional load relative to an axis,
   the intermediate mount is configured to react to at least a thrust load along the axis, and
   the aft mount is configured to react to at least a vertical load and a second side load.

6. The integrated propulsion system as recited in claim 5, wherein the intermediate mount is attachable to an engine intermediate case.

7. The integrated propulsion system as recited in claim 6, wherein the aft mount is attachable to one of a mid-turbine frame and a turbine exhaust case.

8. The integrated propulsion system of claim 7, wherein:
   the fan nacelle is arranged at least partially about the core cowling to define the bypass flow path.

9. The integrated propulsion system as recited in claim 8, wherein the forward mount is attachable to the fan nacelle.

10. The integrated propulsion system as recited in claim 9, wherein the aft mount is attachable to the mid-turbine frame.

11. The integrated propulsion system as recited in claim 5, wherein the forward mount is attachable to the intermediate mount.

12. The integrated propulsion system as recited in claim 5, wherein the intermediate mount is attachable to the aft mount.

13. The integrated propulsion system as recited in claim 9, wherein the aft flowpath portion circumferentially defines an angle between the opposite sides of the single bifurcation, and the angle is greater than about 180 degrees.

14. The integrated propulsion system as recited in claim 13, wherein the aft nacelle is moveable along the axis relative to the fan nacelle.

15. The integrated propulsion system as recited in claim 14, wherein the angle is greater than or equal to about 320 degrees.

16. The integrated propulsion system as recited in claim 9, wherein only the forward mount relative to the mounting assembly is configured to react to torsional loads.

17. The integrated propulsion system as recited in claim 9, wherein a plurality of circumferentially spaced struts extend in the bypass flow path radially between the engine intermediate case and a fan case surrounding the fan, and the plurality of struts are positioned axially between the fan and the single bifurcation.

18. The integrated propulsion system as recited in claim 10, wherein only the aft mount relative to the mounting assembly is configured to react to torsional loads, and the bypass ratio is greater than or equal to about 12.

* * * * *